Aug. 12, 1941.   W. J. COX   2,252,481
VEHICLE WHEEL
Filed Nov. 25, 1940
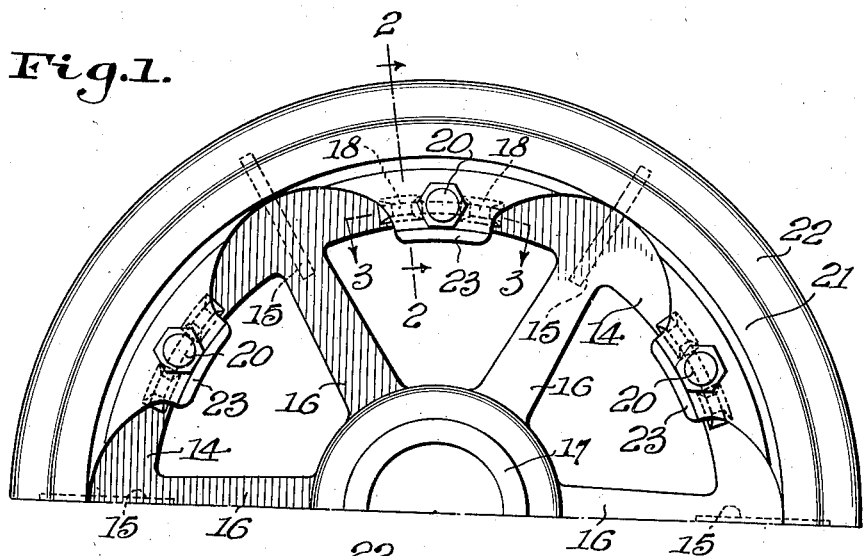
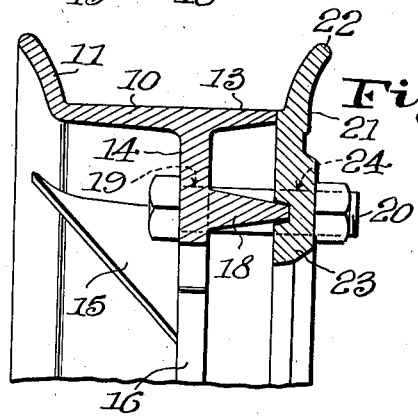
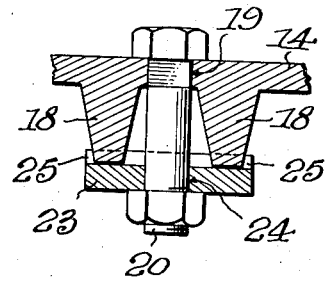
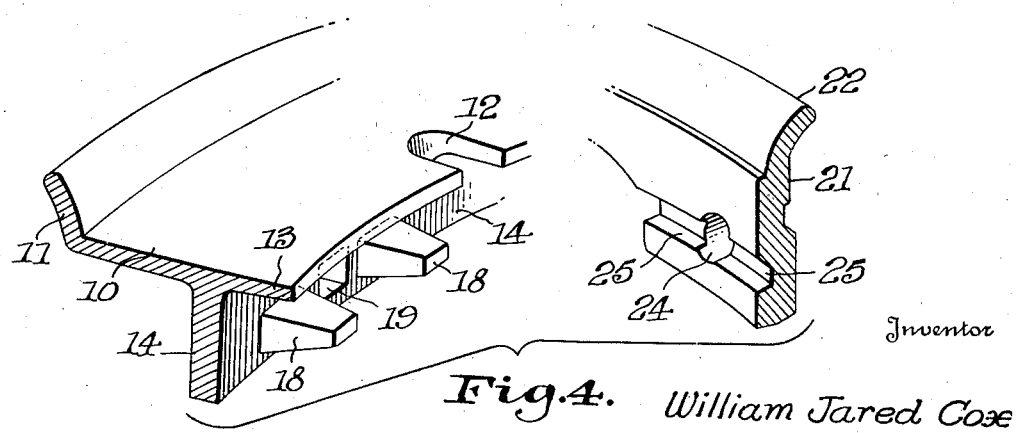
Inventor
William Jared Cox Patented Aug. 12, 1941

2,252,481

UNITED STATES PATENT OFFICE 2,252,481

VEHICLE WHEEL

William Jared Cox, Woodruff, Utah

Application November 25, 1940, Serial No. 367,085

3 Claims. (Cl. 301—63)

The invention relates to wheels for pneumatically tired vehicles and aims to provide a new and improved construction which will greatly facilitate tire changing.

In carrying out the above end, a further object is to provide a construction which will be exceptionally simple and inexpensive, yet strong and durable.

With the foregoing in view, the invention resides in the novel subject matter hereinafter described and claimed, description being accomplished by reference to the accompanying drawing.

Figure 1 is a partial side elevation of a wheel embodying the invention.

Figure 2 is a transverse sectional view on line 2—2 of Fig. 1.

Figure 3 is a detail sectional view on line 3—3 of Fig. 1.

Figure 4 is a disassembled sectional perspective view.

In the drawing above briefly described, 10 denotes a continuous rim having a bead-engaging flange 11 on one edge only. In the present showing, a notch 12 opens through the other edge 13 of the rim 10 to receive the usual tire inflation valve. The inner periphery of the rim 10 is provided with a continuous inwardly projecting flange 14 near the edge 13, and if desired, transverse webs 15 may be integrally joined to said rim and flange to reinforce and relatively brace the same. In the construction shown, the spokes 16 which radiate from a wheel hub 17, are integral with the inner edge of the flange 14.

The side of the flange 14 toward the rim edge 13 is provided with circumferentially spaced laterally projecting lugs 18, said lugs being disposed in pairs. The flange 14 is also provided with bolt holes 19 disposed one between the lugs 18 of each pair. These bolt holes are preferably square to receive squared portions of the bolts 20 which pass through them.

A detachable ring 21 lies against the rim edge 13 and is formed with a bead-engaging flange 22 cooperable with the flange 11 in holding the usual tire upon said rim. The inner edge of the ring 21 is provided with inwardly projecting ears 23 having bolt holes 24 alined with the bolt holes 19 and receiving the bolts 20. Two grooves 25 are formed in the inner side of each lug 23, said grooves extending circumferentially of the wheel at opposite sides of the bolt hole 24. These grooves snugly receive the outer ends of the lugs 18, which lugs are integral with the flange 14 which is integrally joined to the rim 10. The lugs and grooves thus cooperate in establishing rigid connections between the ring 21 and the rim 10, relieving the bolts 20 of all strain except securing said ring against lateral separation from said rim.

When the ring 21 is removed, it is a simple matter to slide a tire and tube onto the rim 10, whereupon said ring may be quickly and easily bolted in place to secure the tire. Obviously, the tire may be dismounted with equal ease.

Excellent results are attainable from the details shown and described and they are, therefore, preferably followed. However, within the scope of the invention as claimed, minor variations may be made.

I claim:

1. A wheel rim having a bead-engaging flange on one edge only, the inner periphery of said rim being provided with a continuous inwardly projecting flange near the other edge of said rim, the side of said inwardly projecting flange toward said other edge being provided with integral circumferentially spaced laterally projecting lugs disposed in pairs, said inwardly projecting flange being formed with bolt holes disposed one between the lugs of each pair, a ring lying against said other edge of said rim and having a second bead-engaging flange, said ring projecting inwardly from the inner periphery of said rim and having bolt holes alined with those aforesaid, the inner side of said ring being provided with grooves extending circumferentially from the bolt holes of said ring and snugly receiving the outer ends of the aforesaid lugs, and bolts passing through the bolt holes of said inwardly projecting flange and said ring.

2. A structure as specified in claim 1; together with transverse webs integral with said rim and said inwardly projecting flange to relatively brace the same.

3. A structure as specified in claim 1; together with wheel spokes radiating from a hub and integrally joined to the inner edge of said inwardly projecting flange.

WILLIAM JARED COX.